May 25, 1954     H. G. STARCK     2,679,333
VARIABLE LENGTH TANK VENT
Filed March 8, 1952
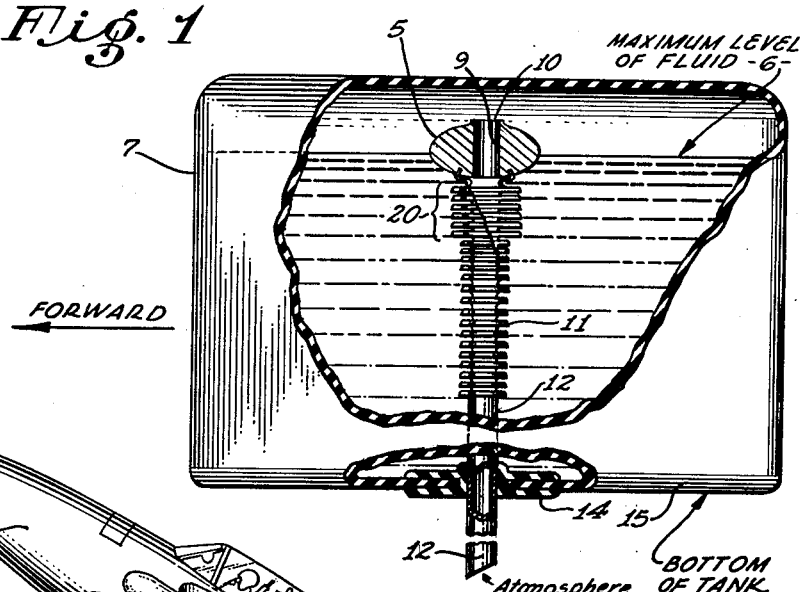
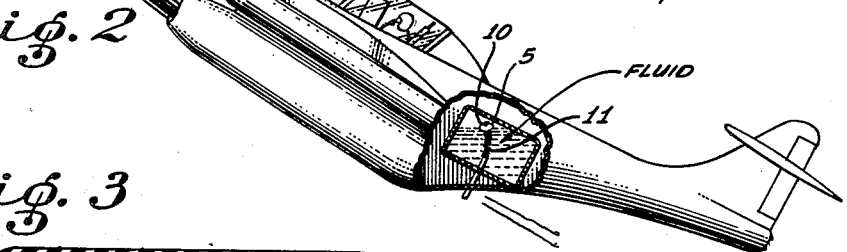
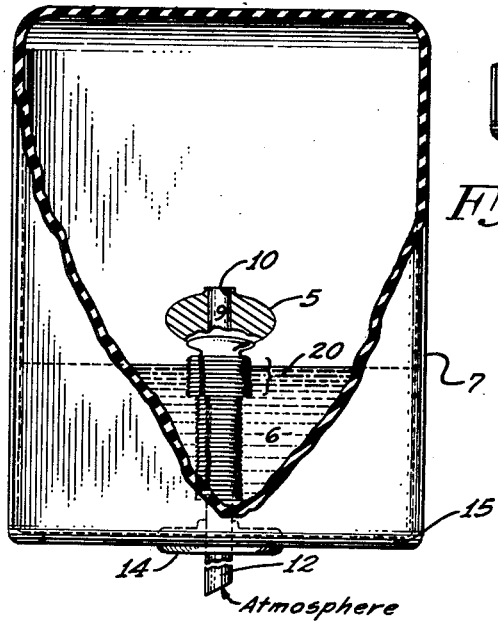
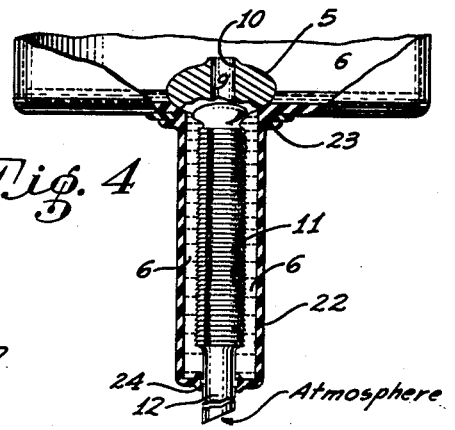
INVENTOR:
HALVAR G. STARCK
BY Herbert E. Metcalf
HIS PATENT ATTORNEY Patented May 25, 1954

2,679,333

UNITED STATES PATENT OFFICE 2,679,333

VARIABLE LENGTH TANK VENT

Halvar G. Starck, Redondo Beach, Calif., assignor to Northrop Aircraft, Inc., Hawthorne, Calif., a corporation of California Application March 8, 1952, Serial No. 275,571

1 Claim. (Cl. 220—85)

My present invention relates to tank vents, and more particularly to an improvement on the fuel tank vent breather tube shown, described, and claimed in my copending application, Serial No. 228,639, filed May 28, 1951.

Vent tubes such as the one referred to above are provided to admit air into fuel tanks so that vapor can escape therefrom through a breather tube, the inner opening of which is maintained above the surface level of the tank fluid at all times.

It is an object of the present invention to provide a flexible breather tube for airplane fuel tanks which, as the angle of attack of the aircraft changes in flight and the fluid tank therewith, a floatable member carrying a vent opening is enabled by, the flexible breather tube, to freely move in any lateral direction on the surface of the fluid in accordance with changes in the angular position of the tank, such as occurs when the aircraft is in a dive, climb, or vertical bank for example, and the vent opening is thus maintained above the surface level of the tank fluid at all times during normal flight maneuvers.

An object of my present invention is to provide an improved breather tube for venting a fluid storage tank in an airplane which, in addition to the advantages enumerated above, will also maintain a vent opening inside the tank in proper position with respect to the surface level of the fluid stored therein during rise and fall of the fluid as well as during the varying positions of the airplane in flight.

Other objects and advantages will be understood as the description continues.

Briefly, my invention can take the form of a floatable member defining a vent opening on the surface of fluid in an aircraft storage tank and above the level thereof. A flexible breather tube is connected at one end thereof to the opening in the floatable member. The breather tube extends downwardly through the tank and is connected to an opening in the bottom of the tank and is there sealed. The breather tube is passed through the seal and is then connected to the atmosphere. The breather tube, or a portion thereof, is made variable in length and, for the present example, is in the form of a flexible tubular expandable bellows. Preferably, the diameter of the flexible breather tube is increased near its junction with the floatable member to aid the member in maintaining its proper position with respect to the fluid surface level.

My present invention will be further clarified by reference to the drawings wherein:

Figure 1 is a side elevational view of a fluid storage tank which is partly cut away to show the tank vent of the present invention in one preferred form; the tank vent also being partly sectionalized to show the construction thereof.

Figure 2 is a side elevational view of an airplane which is partly cut away to the relative position of a fluid tank during a climbing maneuver; the tank being in sectionalized view to show the tank vent with respect to the level of the fluid in the tank.

Figure 3 is a side elevational view of a fluid storage tank which is partly cut away to show the position of tank vent of Figures 1 and 2 wherein the fluid level has dropped appreciably below maximum level of the tank.

Figure 4 is an elevational view of a fluid storage tank, partially sectionalized to show the construction of the present invention in another form.

Referring first to Figures 1 and 3, wherein a floatable member 5 is floated on the surface of fluid 6 inside a storage tank 7. The float 5 is provided with a duct 9 which extends coaxially therethrough. The duct 9 provides a vent opening 10 at the top of the float 5; the axis of the vent opening 10 being maintained generally at right angles to the level of the fluid 6 when the tank is in normal attitude.

A flexible type breather tube 11 is coaxially connected to the other end of duct 9 and is extended downwardly through the tank 7 to be connected to the inner end of a rigid breather tube 12 which preferably extends through a neoprene seal 14 in the bottom wall 15 of the tank 7, and is then routed to the atmosphere through a venting system (not shown).

The flexible breather tube 11, as shown, is in the form of an expandable tubular accordion type bellows and is preferably made of a material which is not significantly corroded or otherwise adversely affected by hydraulic oils or aromatic fuels, such as copper for example when such fluids are tanked. A durable flexible accordion type breather tube 11 which is capable of being varied in length results.

The breather tube 11 is made flexible enough to allow lateral movements of the floatable member 5 on the surface of the fluid 6. It should be noted, however, that the flexibility of the tube 11 should be limited to a degree where undesirable looping or kinking thereof is prevented.

The diameter of the breather tube can be increased adjacent the floatable member 5, as shown, to provide an enlarged portion 20 which will aid the floatable member 5 in maintaining its proper position with respect to the fluid surface level 6 and allow freer lateral and tilt movement of the assembly during change in fluid level angle.

In the climbing aircraft 21 illustrated in Figure 2, the tank 7 of Figure 1 is shown in a general relative position as usually installed in an aircraft 21. It will be noted that the fluid level has moved, with respect to the tank 7, to a position wherein conventional fixed tank vents placed in the usual manner might be covered by the fluid with the result that fluid might be siphoned or spilled through the breather tube and carried overboard. It can be seen, however, that with the breather tube 11 of the present invention, the floatable member 5 is permitted to freely move in any lateral direction with the plane of float 5 substantially parallel to liquid surface level so that the vent opening 10 is always maintained above the surface of the fluid; the breather tube 11 also being capable of varying its length in accordance with the change in depth of the fluid.

In the case of fluid tanks wherein fluid is withdrawn, causing the fluid level 6 to drop as shown in the tank 7 in Figure 3, to a point where the floatable member 5 is no longer floated, the breather tube 11 will stack under the weight of the float 5 to its minimum length to provide a substantially stiff upright standpipe, the float 5 remaining at the top end thereof and normal to the fluid. If, however, a steep climb or dive for example, is made by the aircraft, with the fluid level 6 changing in accordance therewith, the float 5 will be refloated and normal venting continued without interruption.

In the event the stacked upright breather tube standing unsupported in a nearly empty tank, as shown in Figure 3, would be objectionable, another form the present invention may take is shown in Figure 4. A sleeve 22 is fastened through a seal 23 in the bottom of a tank. The lower end of the sleeve is provided with another seal 24 through which the rigid portion 12 of the breather tube of Figures 1, 2, and 3 is extended. The bellows portion 11 of the breather tube passes upwardly and is connected, as before, to the floatable vent 9. The diameter of the float 5 is made greater than the diameter of the sleeve 22 so as to remain in the tank at all times.

When the tank is filled, the breather tube expands out of the sleeve 22 and upwardly through the tank fluid as before; the float 5 carrying the vent opening 10 above the surface level of the fuel as in the previous examples. As the level of the tank fluid drops and the float therewith, the breather tube will retract into the sleeve 22 as shown in Figure 4. The small amount of fluid 6 trapped in the sleeve around the breather tube 11 will, in most cases, be negligible.

It has thus been shown that the improved breather tube of my invention is capable, by virtue of its freer relative movement and expandibility, of maintaining a vent opening in an airplane fluid storage tank in proper position with respect to the surface level of fluid stored therein over a wider range of conditions during flight as well as during attitude changes of the tank during flight maneuvers.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claim.

What is claimed is:

A breather tube for an aircraft fuel tank, comprising a flexible tube open at both ends thereof, a floatable member inside of said tank and floatable on the surface of fluid in said tank, means defining a vent passage through said floatable member and open at both ends thereof, the axis of said vent passage being generally perpendicular to the surface of said fluid so that one end of said vent passage is above the surface of said tank fluid, one end of said tube being extended into said tank and coaxially connected to the other end of said vent passage, a sleeve positioned outside of said tank and coaxially connected at one end thereof to an opening in the bottom of said tank and extending perpendicularly therefrom, the other end of said breather tube extending from said floatable member through said sleeve and passing through a seal in the other end of said sleeve to atmosphere, said tube in said sleeve and said tank being formed of a flexible tubular bellows which is capable of expanding out of said sleeve in accordance with rise of said fluid surface and contracting into said sleeve in accordance with fall of said fluid surface, said sleeve defining a recess to house said breather tube.

References Cited in the file of this patent

UNITED STATES PATENTS

| Number | Name | Date |
|---|---|---|
| 713,560 | Dodge | Nov. 11, 1902 |
| 781,939 | Fulton | Feb. 7, 1905 |
| 1,746,701 | Kimmich | Feb. 11, 1930 |
| 1,791,045 | Stevens | Feb. 3, 1931 |
| 1,852,558 | Dunzweiler | Apr. 5, 1932 |
| 1,871,055 | Hasbrouck | Aug. 9, 1932 |
| 1,978,529 | Harrah | Oct. 30, 1934 |